UNITED STATES PATENT OFFICE.

LUDWIG GEORG BLECKWENN, OF HANOVER, GERMANY, ASSIGNOR TO CHEMISCHE FABRIK VON HEYDEN, AKTIENGESELLSCHAFT, OF RADEBEUL, NEAR DRESDEN, GERMANY.

METHOD FOR THE MANUFACTURE OF SALTS OF FORMALDEHYDE-SULFUROUS ACID WITH ALUMINIUM OXID.

1,149,712.  Specification of Letters Patent.  Patented Aug. 10, 1915.

No Drawing.   Application filed January 11, 1915.  Serial No. 1,660.

*To all whom it may concern:*

Be it known that I, LUDWIG GEORG BLECKWENN, a subject of the King of Prussia, and resident of 242 Hildesheimerstrasse, Hanover, Kingdom of Prussia, German Empire, have invented a new and useful Improvement in the Method for the Manufacture of Salts of Formaldehyde-Sulfurous Acid with Aluminium Oxid, of which the following is a specification.

The present invention has for its object a method for the manufacture of salts of formaldehydesulfurous acid with aluminium oxid.

Several salts of formaldehydesulfurous acid are already known, as for instance the alkali salts and the zinc salt, but it was not known up to now, that aluminiumoxid which is a very weak base was capable of forming stable salts with formaldehydesulfurous acid. It is well known that free formaldehydesulfurous acid is very unstable and is easily decomposed if its solutions are concentrated. It could not be expected that the aluminium salts of this acid would be stable in such a manner that their solutions could be evaporated and dried without any decomposition. It has been found that these salts are of great therapeutic value. They are excellent substitutes for aluminium acetate (liquor aluminii acetici) to which they are superior as regards lack of odor, stability and healing power. The new salts are readily soluble in water, yield a precipitate of aluminium hydroxid when treated with a sodium carbonate solution and are decomposed when heated with strong acids, sulfur dioxid being developed.

The neutral salt as well as basic aluminium salts of formaldehyde sulfurous acid can be produced for the reason that 1 molecule of aluminiumhydroxid can be combined with 3 molecules of a monobasic acid. The basic salt of the formula $$HOCH_2-OSO_2-Al(OH)_2$$

has the great advantage of containing much aluminiumhydroxid and being completely stable in the atmospheric or open air, whereas salts containing more acid are of hygroscopic character. The salts are readily soluble in water.

The method of the present invention can be carried out in different ways. An aqueous solution of formaldehyde and sulfurous acid or a sulfurous acid compound can be treated with an aluminium compound for instance aluminium oxid. It is of little importance in which order the three compounds mentioned are mixed. Sulfurous anhydrid can be introduced into a mixture of formaldehyde and aluminiumoxid, or aluminiumoxid can be suspended in water, whereupon sulfurous anhydrid can be introduced and formaldehyde can be added afterward, but the operation can also be performed as explained hereinafter in Example I.

Instead of aluminium oxid, aluminiumhydroxid or metallic aluminium may be used. It is of course necessary that the aluminium or its compounds are used in a form which allows them to be readily dissolved in the acid solution. Also aluminium salts of acids weaker than formaldehydesulfurous acid, for instance the carbonate, can be employed.

If the basic salt of non-hygroscopic character is to be produced, it is necessary to operate in such a manner that 1 molecule of formaldehyde and 1 molecule of sulfurous acid react with 1 molecule of aluminium oxid, as may be shown by the following example (the parts being by weight):

Example I: 1.5 parts of a 40 per cent. formaldehyde solution are mixed with 8 parts of water. Into this mixture 1.4 parts of sulfurous anhydrid are introduced. 2 parts of aluminiumhydroxid containing 50 per cent. of $Al_2O_3$ are added, while it is being well stirred, to this solution of the so-called formaldehydesulfurous acid. An aluminium-hydroxid readily soluble in acids is preferably employed. A great part of this oxid is already dissolved in the formaldehyde-sulfurous solution at ordinary temperature and the remaining part is dissolved on heating the mass to about 60° centigrade. The solution is kept at this temperature for several hours, then filtered and evaporated on a water-bath. The salt is dried in drying-rooms at about 50° centigrade and forms a crystalline powder, readily soluble in water and capable of being recrystallized from water. If the crystallization is allowed to take place very slowly, the salt is obtained in transparent six-sided lamellæ.

The method described above may be modified in various ways.

Aluminium salts of formaldehyde sulfurous acid can of course also be prepared by not starting from the free sulfurous acid but from its salts. These salts especially the sulfites and bisulfites, are treated in the presence of formaldehyde with aluminium salts, whereupon a so-called double reaction will take place. In the following example the manufacture of a neutral aluminium salt of formaldehyde sulfurous acid from sodium bisulfite, formaldehyde and aluminium chlorid will be described. The reaction takes place according to the following equation:

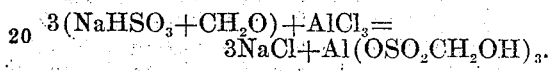
$$3(NaHSO_3+CH_2O)+AlCl_3 = 3NaCl+Al(OSO_2CH_2OH)_3.$$

Example II: 255 parts of a 35 per cent. formaldehyde solution are added to 500 parts of a 40 per cent. sodium bisulfite solution. This mixture containing formaldehyde sodium bisulfite is mixed with 1000 parts of an aluminium chlorid solution containing 135 parts of $AlCl_3$. The solution is evaporated on a water-bath till crystals of sodium chlorid will precipitate. After cooling, the mass is filtered. The filtrate is again evaporated and, if necessary sodium chlorid is again removed by filtering. The concentrated solution can be used immediately, but it can also be evaporated to dryness. If a basic salt is to be prepared it is necessary to add during the operation performed according to the foregoing example a metallic base, oxid or hydroxid, as for instance sodium hydroxid or aluminium hydroxid.

In the following example the manufacture of a basic salt of formaldehyde sulfurous acid from a neutral sulfite is explained, said manufacture being based on the following equation:

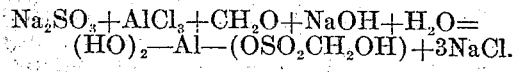
$$Na_2SO_3+AlCl_3+CH_2O+NaOH+H_2O = (HO)_2-Al-(OSO_2CH_2OH)+3NaCl.$$

Example III: 1000 parts of an aluminium chlorid solution containing 135 parts of $AlCl_3$ and 45 parts of a 35 per cent. formaldehyde solution are added to 2000 parts of a sodium sulfite solution containing 6.3 per cent. of $Na_2SO_3$. The mixture is heated to about 50° centigrade while it is being well stirred and at this temperature 200 parts of a 20 per cent. sodium hydroxid solution are slowly added within 3 hours. The solution is hereafter evaporated till sodium chlorid is precipitated, then cooled and filtered. The filtrate is again evaporated, filtered for a second time and at last evaporated and dried at about 50° centigrade.

The above examples only illustrate the manner of operating and can of course be modified to a considerable extent.

Instead of the sodium salt of sulfurous acid any other suitable salts and instead of aluminium chlorid aluminium salts of any other acid may be used.

What I claim is:

1. As a new composition of matter, the aluminium salts of formaldehyde sulfurous acid which are readily soluble in water, yield a precipitate of aluminium hydroxid when treated with a sodium carbonate solution, and which when decomposed with strong acids, yield sulfur dioxid.

2. The method of manufacturing aluminium salts of formaldehyde sulfurous acid which consists in treating formaldehyde and sulfurous acid with aluminium oxid.

3. The method of manufacturing basic aluminium salts of formaldehyde sulfurous acid which consists in treating one molecular proportion of aluminium oxid with one molecular proportion of formaldehyde and one molecular proportion of sulfurous acid.

In testimony, that I claim the foregoing as my invention, I have signed my name in presence of two witnesses, this 8th day of December 1914.

LUDWIG GEORG BLECKWENN.

Witnesses:
T. HENDY RECOL,
MARIE BELINE.